(12) United States Patent
Nilsson et al.

(10) Patent No.: US 9,295,062 B2
(45) Date of Patent: Mar. 22, 2016

(54) METHOD AND ARRANGEMENT FOR POWER ALLOCATION IN COMMUNICATION SYSTEMS

(75) Inventors: Andreas Nilsson, Gothenburg (SE); Fredrik Athley, Kullavik (SE); Mikael Coldrey, Landvetter (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 295 days.

(21) Appl. No.: 14/005,215

(22) PCT Filed: Mar. 16, 2011

(86) PCT No.: PCT/EP2011/053970
§ 371 (c)(1),
(2), (4) Date: Sep. 13, 2013

(87) PCT Pub. No.: WO2012/123025
PCT Pub. Date: Sep. 20, 2012

(65) Prior Publication Data
US 2013/0343328 A1    Dec. 26, 2013

(51) Int. Cl.
| | |
|---|---|
| *H04W 72/04* | (2009.01) |
| *H04B 7/04* | (2006.01) |
| *H04W 52/42* | (2009.01) |
| *H04L 1/00* | (2006.01) |
| *H04L 5/00* | (2006.01) |
| *H04W 52/14* | (2009.01) |
| *H04W 52/34* | (2009.01) |

(52) U.S. Cl.
CPC ......... *H04W 72/0473* (2013.01); *H04B 7/0434* (2013.01); *H04L 1/0003* (2013.01); *H04L 1/0031* (2013.01); *H04W 52/42* (2013.01); *H04B 7/0443* (2013.01); *H04B 7/0447* (2013.01); *H04L 1/0026* (2013.01); *H04L 5/006* (2013.01); *H04L 5/0023* (2013.01); *H04L 5/0039* (2013.01); *H04L 5/0051* (2013.01); *H04L 5/0057* (2013.01); *H04W 52/146* (2013.01); *H04W 52/346* (2013.01)

(58) Field of Classification Search
None
See application file for complete search history.

(56) References Cited

U.S. PATENT DOCUMENTS

| | | | |
|---|---|---|---|
| 2005/0031047 A1 | 2/2005 | Maltsev et al. | |
| 2005/0111376 A1 | 5/2005 | Raghothaman et al. | |
| 2007/0005749 A1* | 1/2007 | Sampath | 709/223 |
| 2008/0080634 A1 | 4/2008 | Kotecha et al. | |
| 2010/0215110 A1 | 8/2010 | Onggosanusi et al. | |
| 2010/0271970 A1* | 10/2010 | Pan et al. | 370/252 |
| 2011/0105064 A1* | 5/2011 | Kusano et al. | 455/129 |
| 2011/0243017 A1* | 10/2011 | Prasad et al. | 370/252 |
| 2012/0051257 A1* | 3/2012 | Kim et al. | 370/252 |
| 2012/0106470 A1* | 5/2012 | Clerckx et al. | 370/329 |
| 2013/0021960 A1* | 1/2013 | Lee et al. | 370/311 |
| 2013/0040705 A1* | 2/2013 | Khojastepour | 455/562.1 |

FOREIGN PATENT DOCUMENTS

WO    WO 2009157513 A1 *  12/2009

\* cited by examiner

*Primary Examiner* — Dung B Huynh
(74) *Attorney, Agent, or Firm* — Patent Portfolio Builders, PLLC (57) ABSTRACT

In a method of allocating power to data streams in a communication system, providing (S10) CQI for each of a plurality of data streams between a radio base station node and a user equipment node in the system. Subsequently, allocating (S20) transmit power to each of the plurality of data streams based at least on the provided respective CQI, and determining coding and modulation (S30) for the data streams based on at least the allocated power.

5 Claims, 13 Drawing Sheets

METHOD AND ARRANGEMENT FOR POWER ALLOCATION IN COMMUNICATION SYSTEMS

CROSS REFERENCE TO RELATED APPLICATION(S)

This application is a 35 U.S.C. §371 National Phase Entry Application from PCT/EP2011/053970, filed Mar. 16, 2011, designating the United States, the disclosure of which is incorporated herein in its entirety by reference.

TECHNICAL FIELD

The present disclosure concerns pre-coding in wireless communication systems in general, particularly improved power allocation in such systems.

BACKGROUND

Pre-coding is a kind of beam forming that supports multi-layer transmission in MIMO radio systems. Simulations have shown that pre-coding increases the performance of wireless communication systems and it has therefore been included in the standardization of LTE (Long Term Evolution). In pre-coding in LTE, each of the multiple streams are emitted from the transmit antennas at the radio base station (RBS) with independent phase and equal amplitude per each antenna such that the throughput is optimized between the radio base station and the user equipment (UE) e.g. mobile. The pre-coding weights are typically calculated at the UE and then the UE informs the radio base station which pre-coding weights that should be used.

Pre-coding can be frequency selective or wideband. In frequency selective pre-coding, PMIs (Precoding Matrix Indicators) can be chosen differently in different frequency sub-bands while a single CQI (Channel Quality Indicator) is chosen for the whole frequency band. In wideband pre-coding, the same PMI is used over the entire frequency band but CQI can be chosen differently in different frequency sub-bands. CQI is a representation of the downlink channel conditions for the user equipment, whereas the PMI represents the recommended pre coder matrix corresponding to the rank e.g. number of independent data streams, depending on estimates of the downlink channel conditions.

One way to increase the channel capacity for a MIMO channel is to use so called water filling. Water filling includes allocating different amount of power to different data streams depending on the eigenvalues of the channel. Simulation results have shown that it is possible to gain from 20-50% in channel capacity when using water filling instead of uniform power allocation for 4×4 MIMO during ideal assumptions and for SINR between 0-20 dB. The gains will probably be even greater for higher order MIMO.

One difficulty with for example LTE is that even though different streams have different SINR for different frequencies, the same power is typically allocated to each stream over the whole frequency band. This is not optimal in the sense of maximizing the throughput. Therefore, there is a need to find methods of improving the power allocation to optimize the throughput.

SUMMARY

The present disclosure aims to obviate some of the above-mentioned problems, and to provide improved power allocation during pre-coding in a wireless communication system.

A first aspect of the present disclosure includes a method of allocating power to data streams in a communication system. A channel quality indication (CQI) is provided for each of a plurality of data streams between a radio base station node and a user equipment node in the system. Subsequently, transmit power is allocated to each of the plurality of data streams based at least on the provided respective CQI. Finally, determining coding and modulation for the data streams based on at least the allocated power.

A second aspect of the present disclosure includes a method of allocating power in a radio base station node in a communication system, which radio base station exchanges a plurality of data streams with a user equipment node in the system. The method includes receiving a respective CQI for each of the plurality of data streams from the user equipment node, and allocating power to each of the plurality of data streams based on at least the received CQI. Finally, the method includes determining coding and modulation for each of the plurality of data streams based on at least the allocated power.

A third aspect of the present disclosure includes a method of enabling power allocation for data streams in a user equipment node in a communication system, which user equipment node exchanges the plurality of data streams with a radio base station node in the system. The method includes determining a rank comprising a subset of the plurality of data streams, a PMI for the determined rank, and CQI for each data stream. Finally, the method includes reporting the determined rank, corresponding PMI and CQI to the radio base station node, to enable allocation of power to the plurality of data streams.

A fourth aspect of the present disclosure includes a radio base station node in a communication system, which radio base station node is capable of exchanging a plurality of data streams with a user equipment node in the system. The radio base station node includes a transceiver configured for receiving a rank and precoding matrix indication (PMI) and a respective CQI for each of the plurality of data streams from the user equipment node, a power allocator configured for allocating power to each of the plurality of data streams based on at least the received CQI. Further, the radio base station node includes a coding and modulation selector configured for determining coding and modulation for each of the plurality of data streams based on at least the allocated power.

A fifth aspect of the present disclosure includes a user equipment node in a communication system, which user equipment node is capable of exchanging a plurality of data streams with a radio base station node in the system. The user equipment node includes a rank, PMI and CQI provider configured for determining a rank, a PMI for the rank, and CQI for each of the plurality of data streams. Further, the user equipment node includes a transceiver configured for providing the determined rank, PMI and CQI to the radio base station node, to enable allocation of power to the plurality of data streams.

Advantages of the present disclosure includes enabling improved power allocation to increase throughput without any extra signaling.

BRIEF DESCRIPTION OF THE DRAWINGS

The invention, together with further objects and advantages thereof, may best be understood by referring to the following description taken together with the accompanying drawings, in which.

ABBREVIATIONS

CQI Channel Quality Indicator
LTE Long Term Evolution
MCS Modulation and Coding Scheme
MIMO Multiple Input Multiple Output
PA Power Amplifier
PMI Precoding Matrix Indicator
SINR Signal to Interference and Noise Ratio
UE User Equipment

DETAILED DESCRIPTION

Throughout the drawings, the same reference numbers are used for similar or corresponding elements. The description below is based on a downlink scenario (radio base station to user equipment communication) but the methods and arrangements may equally well be used in an uplink scenario.

In order to provide some further background to the present disclosure, a few aspects of prior art will be described below.

A simplified architecture of a prior art LTE communication system comprising a radio base station node and a user equipment with four antennas each will be described with reference to FIG. 1. S1, S2, S3 and S4 are data streams, P is a precoding matrix that is utilized for precoding each stream. P is a unitary matrix with equal gain entries that divides the power of each stream equally between all antennas but with different phases. The cell specific reference signals are not precoded, which means that they are introduced after the precoding, which can be seen in FIG. 1. One important purpose of the cell specific reference signal (RS) is to calculate the rank, PMI and CQI that should be used in the downlink in the next time slot. The UE specific RS are precoded which means they are introduced prior to the precoding. The UE specific RS are mainly used for demodulating the data from the stream S1, S2, S3 and S4.

Figure 1:
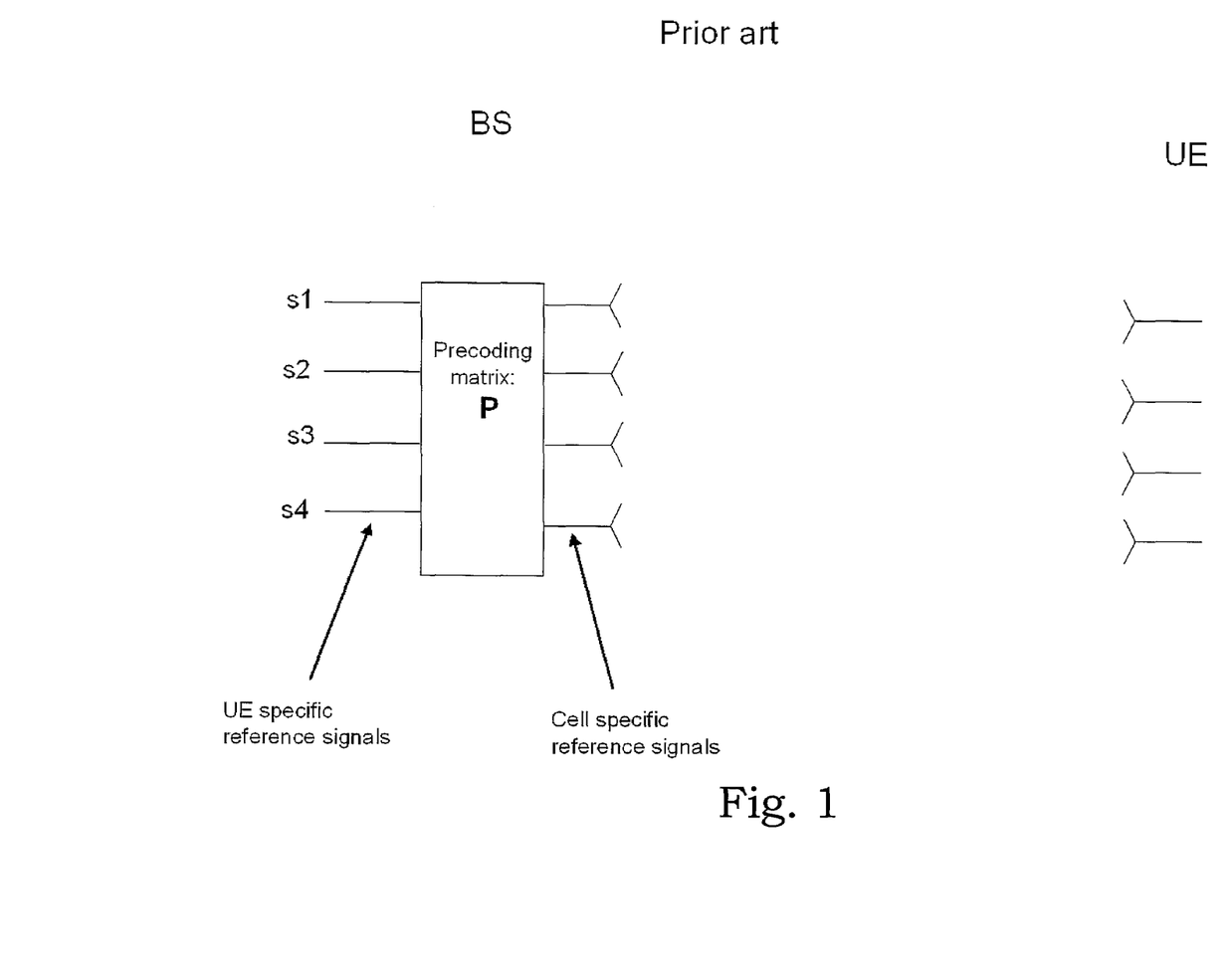
FIG. 1 is a schematic illustration of prior art.
Figure 2:
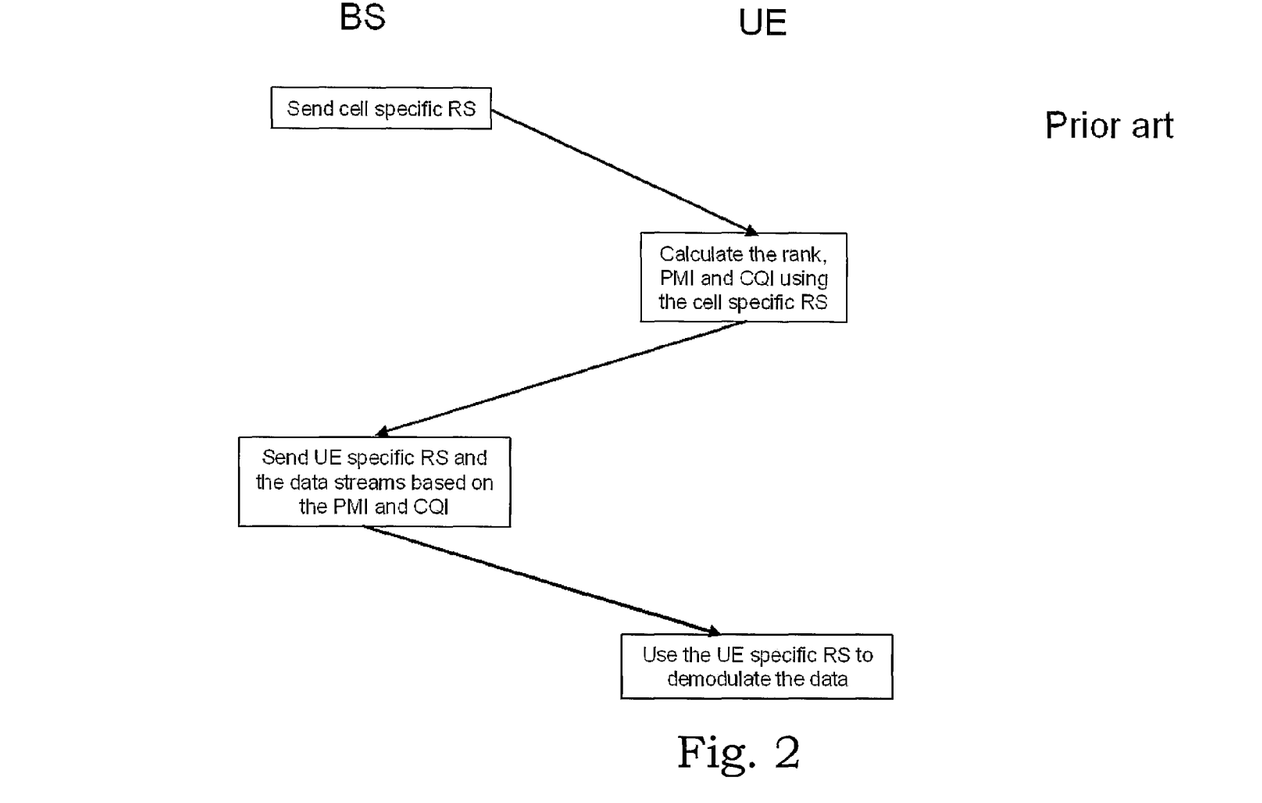
FIG. 2 is a schematic flow chart of a prior art method.

A simplified signaling scheme according to the prior art system of FIG. 1 is shown in FIG. 2. Cell specific reference signals (RS) or pilot signals are transmitted from the radio base station to the user equipment. The user equipment calculates the rank, PMI for each rank and CQI for each data stream and transmits the calculated values to the radio base station. For wideband precoding, the rank and PMI are chosen for the whole frequency band, while the CQI is calculated for every sub band. Subsequently, the radio base station sends UE specific reference signals and the data streams based on the PMI and CQI. Finally, the UE utilizes the UE specific RS to demodulate the received data streams.

Figure 3:
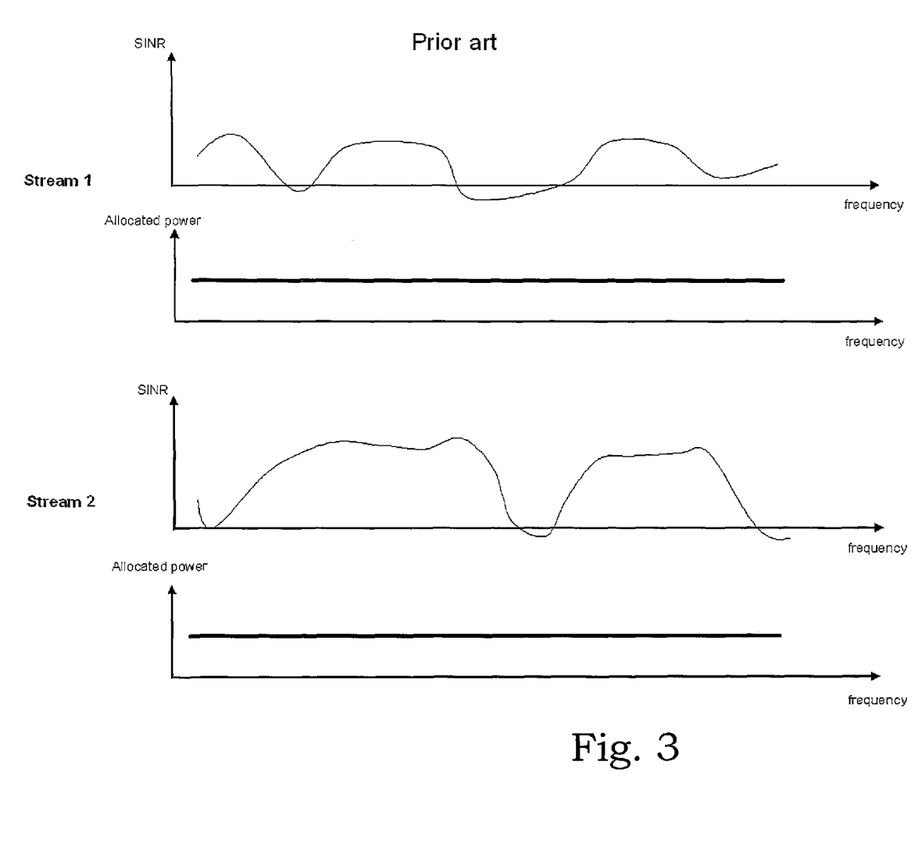
FIG. 3 illustrates power allocation to two data streams in a prior art system.

The power allocation for two data streams according to the above described power allocation scheme is shown in FIG. 3. As can be seen, the allocated power is the same for each respective stream over the whole frequency band regardless of what SINR respective stream has. This is not optimal for maximizing the throughput.

As stated previously, there is a need for improving the power allocation in a precoder in order to optimize or maximize the throughput. A beneficial solution to this and other problems has been identified by the inventors, in which power is allocated to different streams and or different sub-bands based on channel quality indication reports already signaled from the user equipment to the radio base station. This will not increase the signaling between the user equipment and the radio base station, since it utilizes already existing signaled properties.

Figure 4:
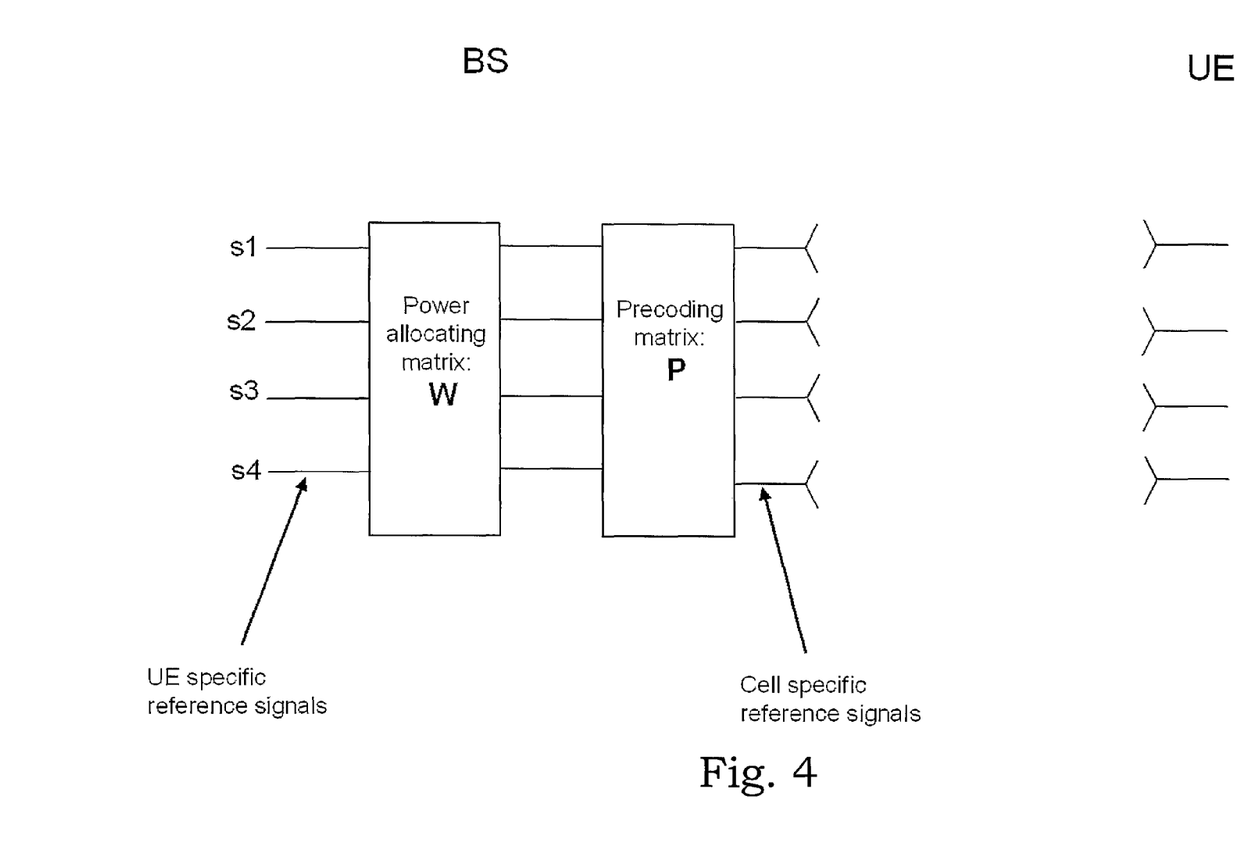
FIG. 4 is a schematic illustration of an embodiment of a system according to the present disclosure.
Figure 5:
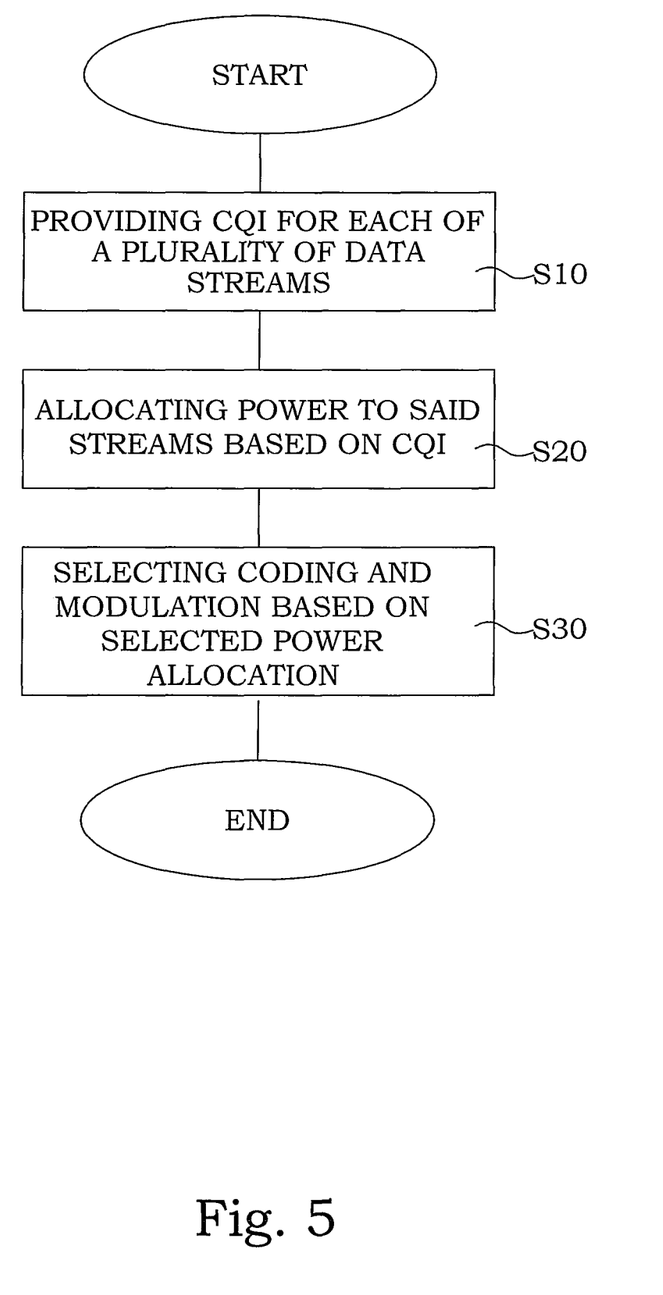
FIG. 5 is a schematic flow chart of an embodiment of a method according to the present disclosure.

With reference to FIG. 4, a general embodiment of a method according to the present disclosure will be described. A power allocation matrix W is introduced into the precoder at the radio base station. The power allocation matrix W is determined based on reported channel quality indicators for the data streams. W is a diagonal matrix and only allocates different power to each stream based on the CQI reports in order to increase the throughput. The UE specific RS is also passed through the power allocating matrix W. The reason for this is because then there is no need for the UE to estimate the transmit power of each stream or for the radio base station to signal to the UE the transmitted power applied to each stream. This is further disclosed in FIG. 5, wherein a respective channel quality indicator (CQI) is provided S10 for each of a plurality of data streams to be transmitted. Subsequently, power is allocated S30 to each of the data streams based at least on the provided respective CQI. In addition, coding and modulation schemes are selected S30 for the data streams at least partly based on the selected power allocation.

It is important to note a few particulars that further improve the functionality of the presented solution. Particularly, in order to achieve the best performance of the present disclosure the following assumption about the receiver in the UE is made: The receiver is preferably, but not necessarily, such that when different powers are allocated to the different streams at the radio base station, the SINR for a given stream will change proportionally to the power allocated to that stream. For example, lets assume we have two different streams with power=1 W and SINR=1 for each stream. If we then allocate 0.5 W for stream one and 1.5 W for stream two, then the SINR for stream one will be 0.5 and SINR for stream two will be 1.5. This property can be obtained if the receiver is able to decode each data stream without any interference from the other streams. An example of a receiver that can operate in this way is the QR receiver if it is assumed that correct decisions are made in the detection of each stream [1,2]. With a QR receiver the first stream to be detected is free from inter-stream interference. The second stream to be detected will receive inter-stream interference from the first stream only. If the first stream has been detected correctly, this can be subtracted in the detection of the second stream. Continuing in this way for the other streams each stream can be detected without any inter-stream interference.

To improve the throughput even further when using power allocation, the power allocation algorithm used in the radio base station can also be implemented in the UE. If so, the UE can test which throughput it will get for different PMIs given that power allocation at the radio base station is applied. It can therefore choose the PMI that gives the highest throughput when power allocation is used at the radio base station. Otherwise, the UE will just choose the PMI that gives the highest throughput without power allocation, which might not be the same PMI as if power allocation is applied.

Since the CQI reports are known both to the UE and the radio base station it can be assumed that the chosen power allocation which is CQI based is also known to both the UE and radio base station and, thus, the UE knows how the power allocation of the data differs from the power allocated to the reference signals. This knowledge is needed for demodulation of the data. If, however, the power allocation is unknown to the UE then one solution is to apply the same power allocation that is applied to the data also to the UE specific reference signals. The power allocated UE-specific reference signal is then used for demodulation of the data. However, one has to be careful with different receiver mismatches for different data streams since using different powers on the pilots will have influence on the quality of the channel estimates.

The average signal powers on each antenna branch are identical since it is assumed that the precoding matrices, as standardized in LTE, all have identical gain entries. Thus, there is no inherent problem with power amplifier efficiency when applying non-uniform power allocation.

Figure 6:
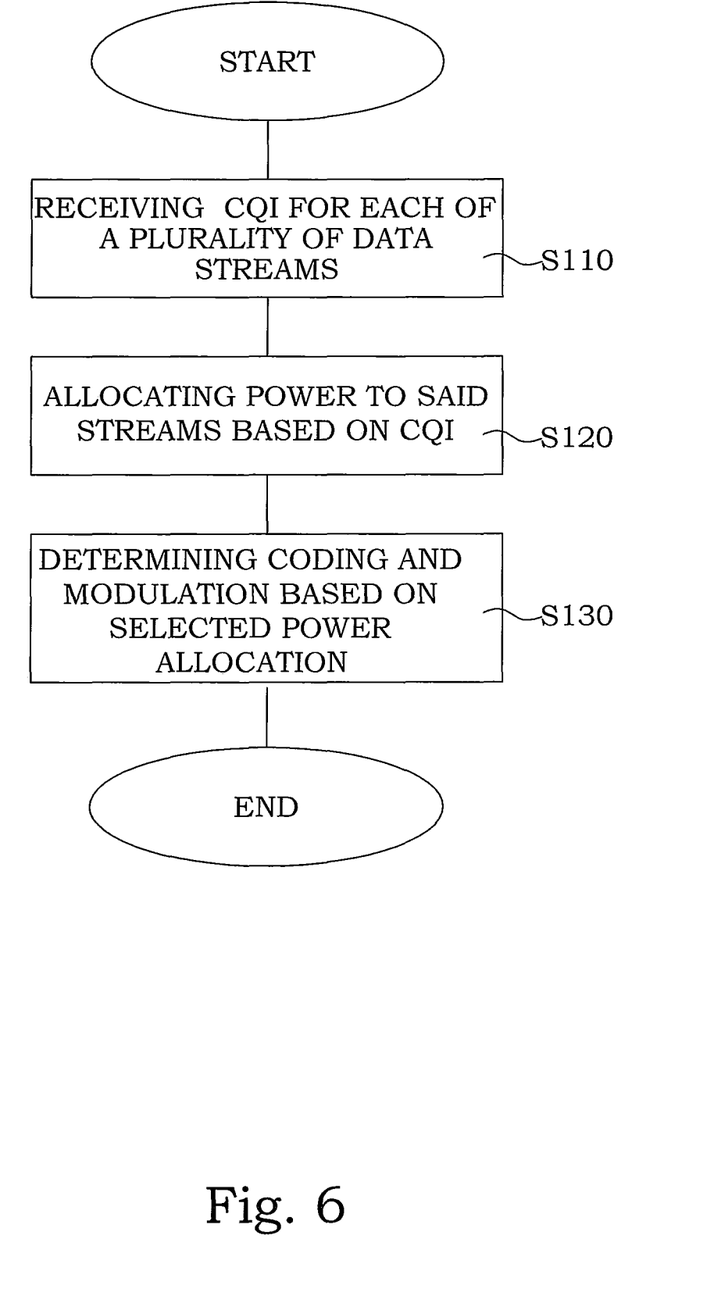
FIG. 6 is a schematic block diagram of embodiments of a system according to the present disclosure.

Below, and with reference to FIG. 6, an embodiment of a method for power allocation in a radio base station node exchanging a plurality of data streams with a user equipment node with will be described. Initially, the radio base station has transmitted cell specific reference signals to the user equipment node. Subsequently, the radio base station node receives S110 a respective CQI for each of the plurality of data streams. Based on the received CQIs, the radio base station node determines and allocates S120 a respective power to the different data streams. Finally, the radio base station node determines S130 a modulation and coding scheme for the data streams at least partly based on the allocated power.

According to one embodiment, the radio base station allocates the same total power to each frequency sub band for each of the plurality of data streams. The total power is understood to be limited by the total available power during a frequency sub band.

According to a further embodiment, the radio base station allocates a different total power to each frequency sub band for the plurality of data streams. In this manner, it is possible to more efficiently utilize the available resources during a specific point in time.

Additionally, it is possible to allocate power to the user equipment specific reference signals based on the same power allocation scheme e.g. based on the reported CQI for each data stream.

A corresponding embodiment of a method of enabling power allocation for data streams in a user equipment node in a communication system, said user equipment node exchanging said plurality of data streams with a radio base station node in said system, will be described with reference to FIG. 7. The user equipment node receives a respective cell specific reference signal for the plurality of data streams from the radio base station. Based on the received signals, the user equipment determines S200 a rank e.g. number of data streams (a subset of the plurality of data streams), a precoding matrix indication (PMI) for the rank, and finally a channel quality indication (CQI) for each data stream. Subsequently, the user equipment node reports the determined rank, PMI and CQI to the radio base station.

Figure 7:
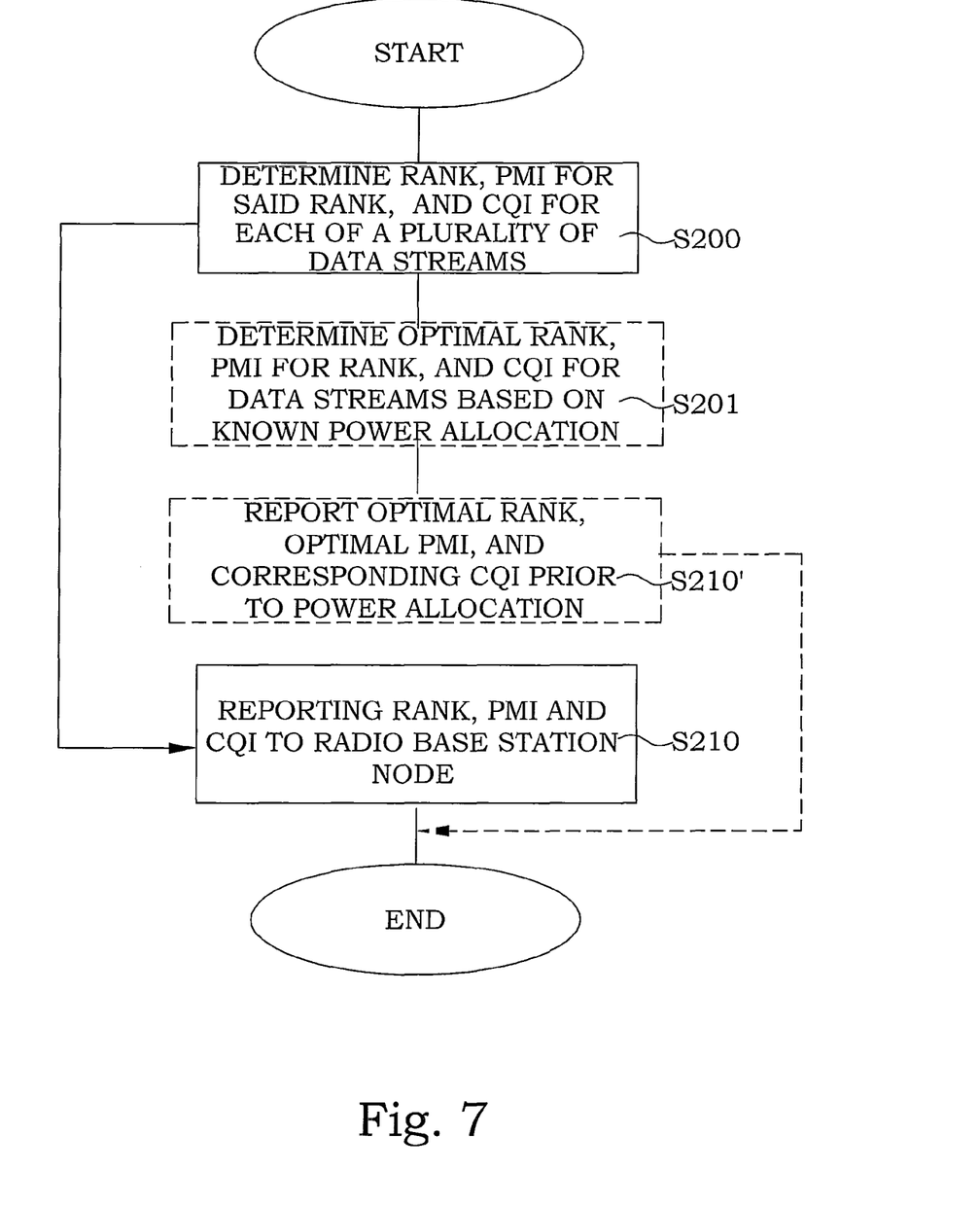
FIG. 7 is a flow chart of an embodiment of a method according to the present disclosure.

According to a further embodiment of a method according to the present disclosure, with reference to FIG. 7, the user equipment node and the radio base station node can both be aware of and share a common power allocation algorithm or scheme. This will enable the user equipment to perform further optimization steps to further improve the throughput for the data streams. Accordingly, the user equipment determines S201 an optimal rank and corresponding PMI, and a CQI for each data stream of the determined optimal rank, based on the knowledge of the power allocation scheme. The optimal rank and its corresponding PMI are reported to the radio base station S210' together with the CQI for each data stream as it would have been if the power allocation had not been applied. In other words, the determined optimal rank and its PMI are reported according to their value after the power allocation has been applied, whereas the value of the corresponding CQI is reported as it appeared before the power allocation was applied.

Figure 8:
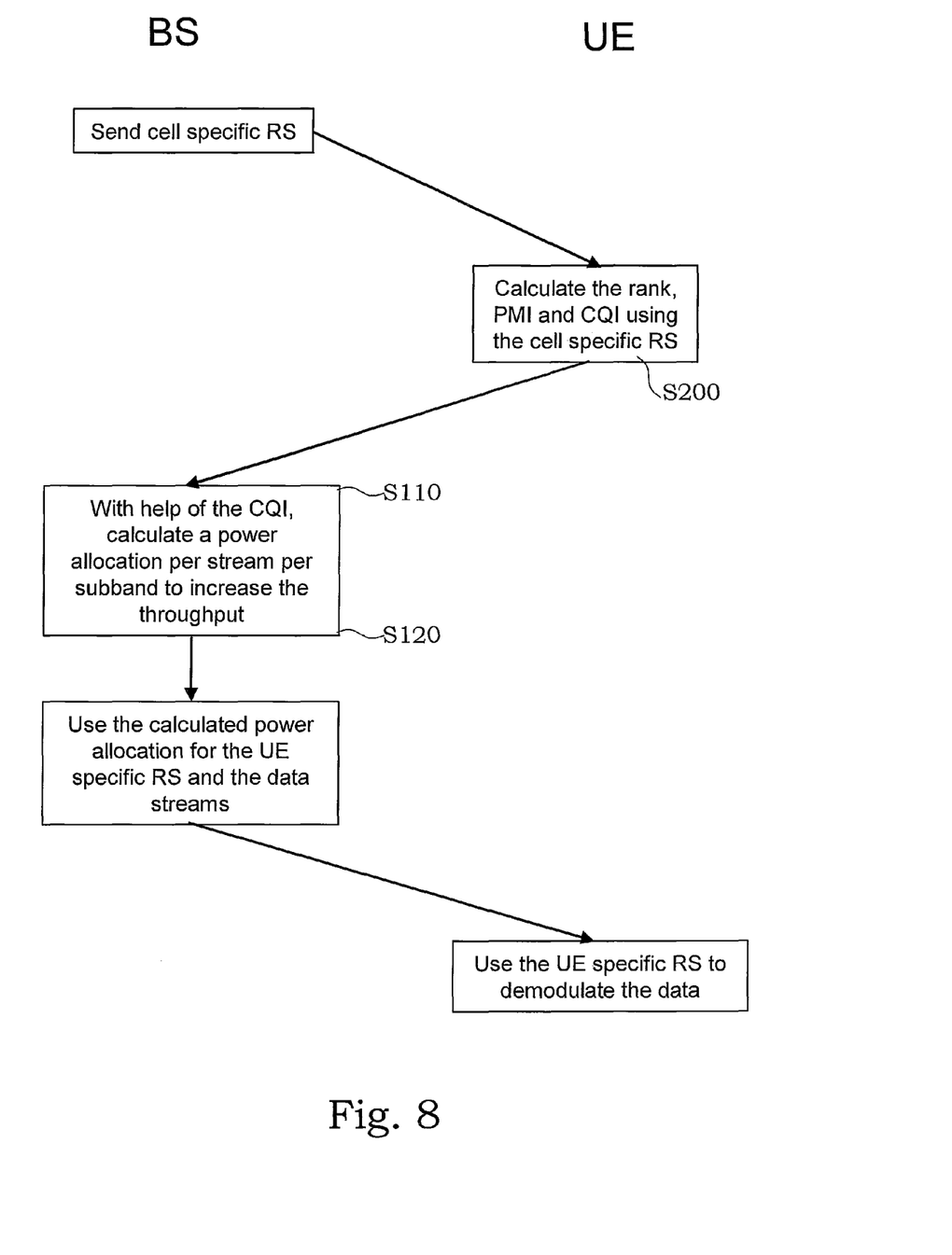
FIG. 8 is a flow chart of a further embodiment of a method according to the present disclosure.

FIG. 8, shows a signaling scheme of an embodiment of the method in a system according to the present disclosure that could be used for communication between a radio base station and a UE. The power allocated to each data stream is calculated with help of a predetermined power allocation algorithm. The power allocation algorithm can for example be a kind of water filling algorithm [3] that allocates more power to a stream the higher SINR that stream has. The SINR is known (within a certain interval) at the radio base station due to the CQI that is signaled from the UE.

Figure 9:
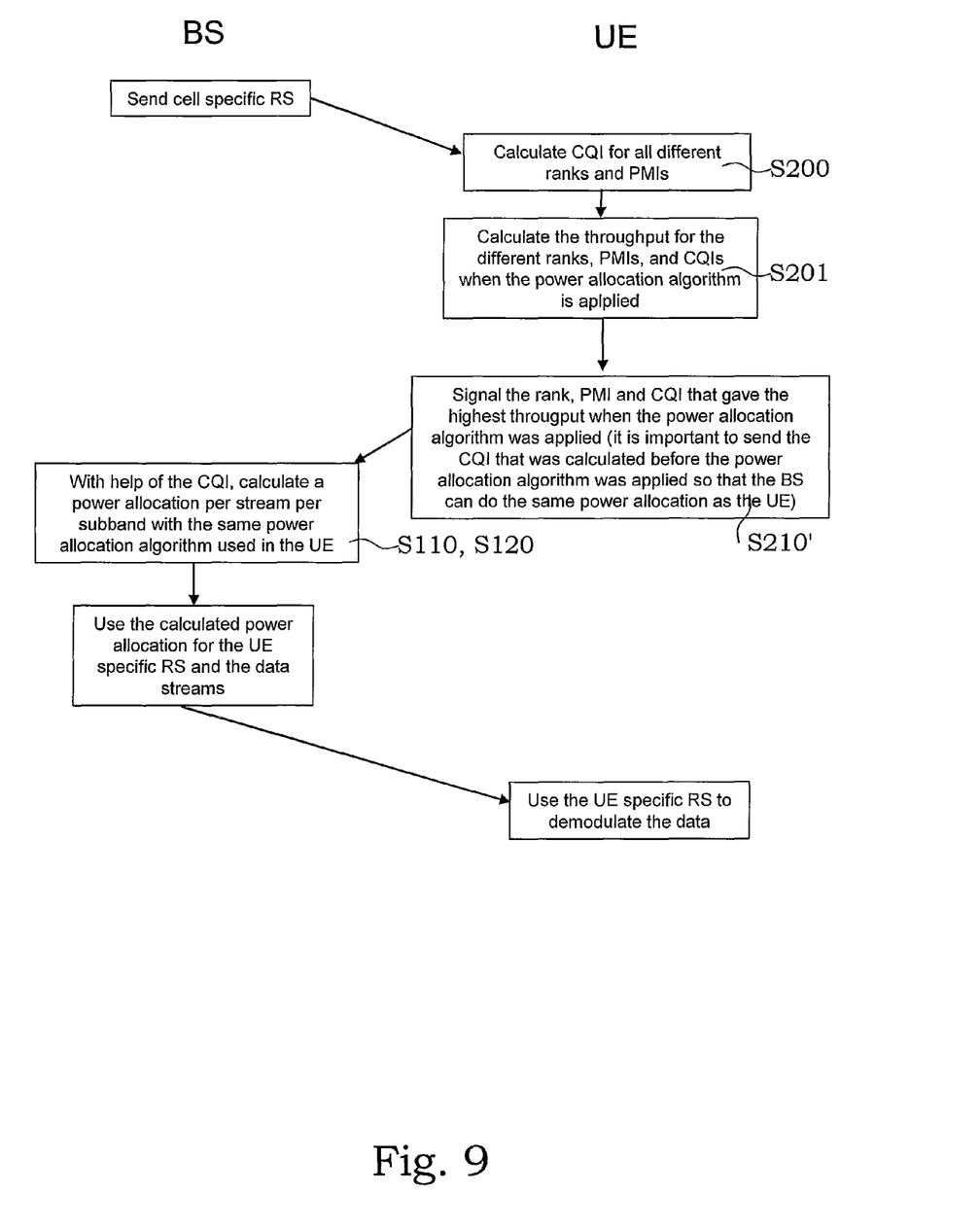
FIG. 9 is a flow chart of another embodiment of a method according to the present disclosure.

FIG. 9 shows a signaling scheme of an embodiment of the method in a system according to the present disclosure that could be used for communication between a radio base station and a UE. In this embodiment the power allocation algorithm is known both at the radio base station and the UE. The UE uses the power allocation algorithm during the optimal rank, PMI and CQI selection process. This means that the rank, PMI and CQI that give the highest throughput when the power allocation is applied is chosen. This was not the case in the method seen in FIG. 8, where the UE selects the rank, PMI and CQ1 that gives the best throughput without the power allocation. Since the power allocation algorithm uses CQI values to calculate the power allocation, it is important that the UE signals the CQI that was calculated before the power allocation algorithm was used. The method in FIG. 9 will give better performance than the method in FIG. 8 but at the cost of more complexity. Additionally, if the UE also knows the power allocation scheme applied by the radio base station then power allocation of the UE specific RS can be avoided.

Figure 10:
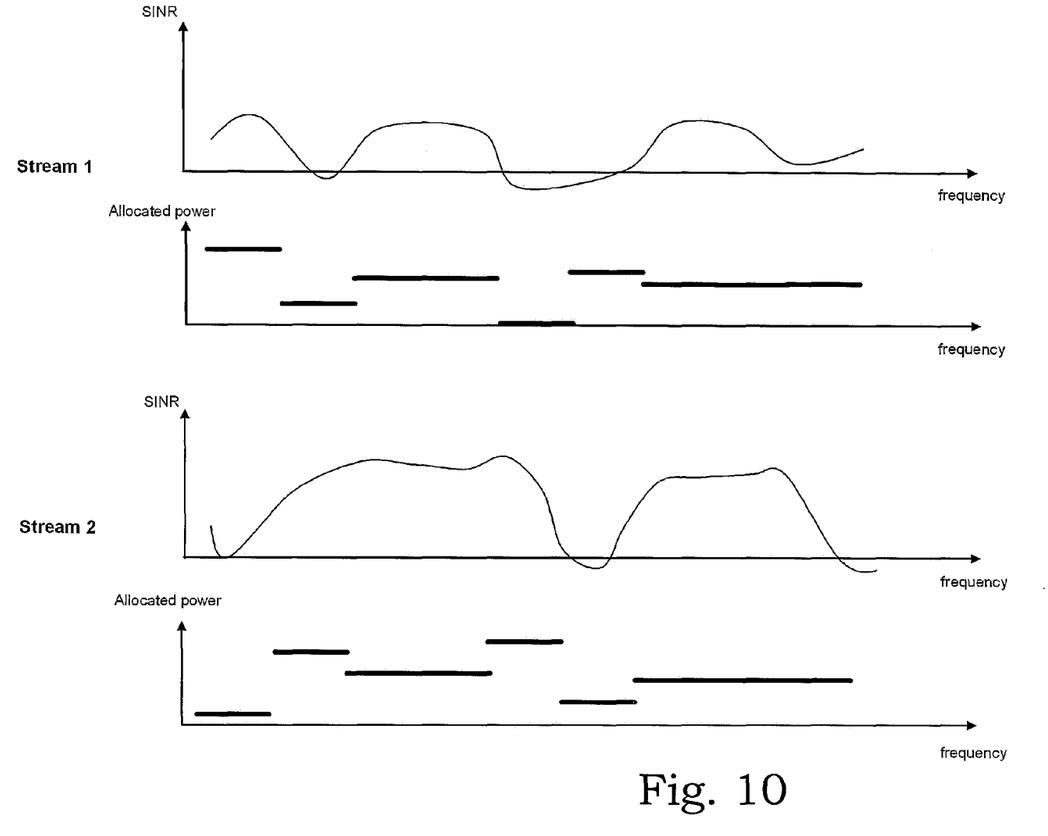
FIG. 10 is a flow chart of yet a further embodiment of a method according to the present disclosure.
Figure 11:
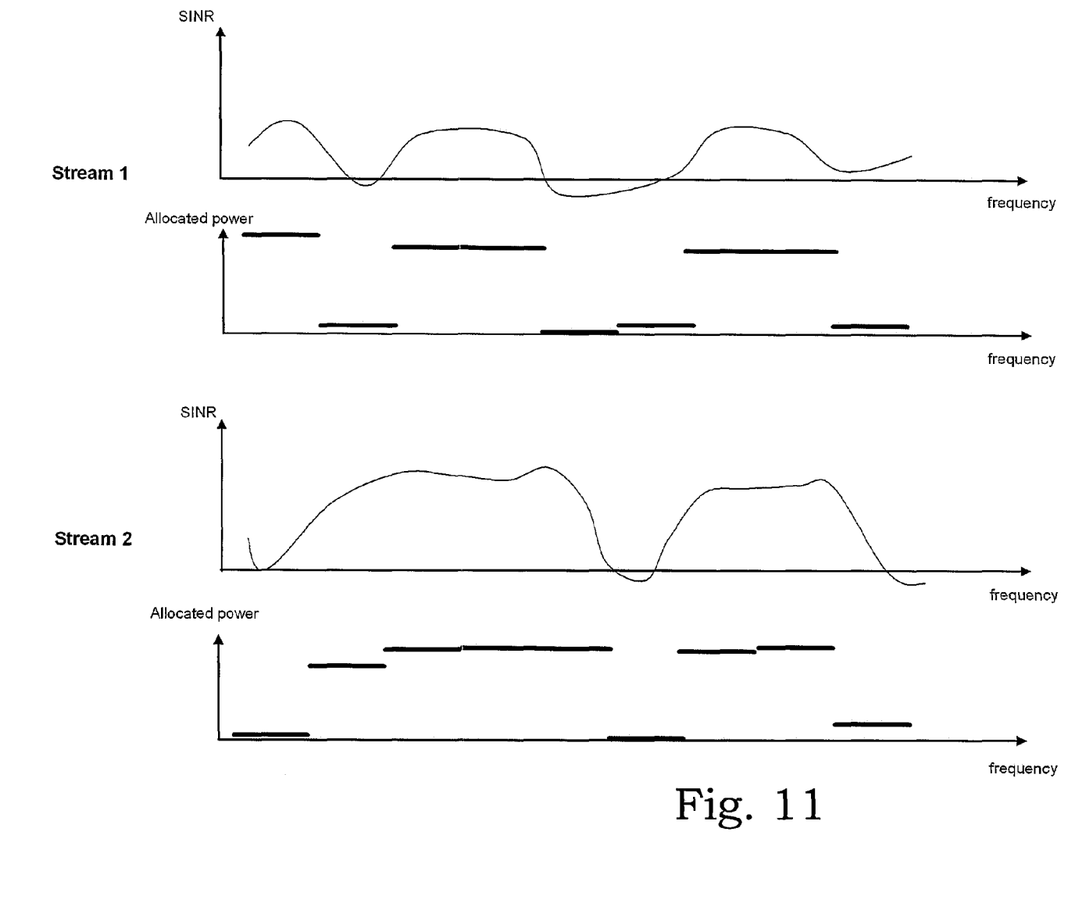
FIG. 11 illustrates improved power allocation to two data streams according to embodiments of the present disclosure.

As was mentioned previously, the power can be allocated in equal or non-equal amounts for each frequency sub band of each data stream; this is further illustrated in FIG. 10 and FIG. 11. FIG. 10 shows an example of how the power could be allocated for two streams with the embodiments of the present disclosure. The size of the frequency sub bands in this example equals the granularity of the CQI reporting in the frequency dimension. However, the size of the sub bands could be even smaller if interpolation between different CQI values was used. The total amount of allocated power is the same for each sub band; the power has just been divided between the two streams for each sub band. FIG. 11 shows an example where the amounts of allocated power are different also for different sub bands. This means that one not only uses different amount of power for different streams, but one also uses different amount of power for different frequency sub bands. This kind of power allocation will give better throughput but at the cost of higher complexity for calculating the optimal power for each stream and each sub band. The PA efficiency would not be a problem when using non-uniform power allocation for different streams due to that the power of each stream will be divided equally between each antenna.

Figure 12:
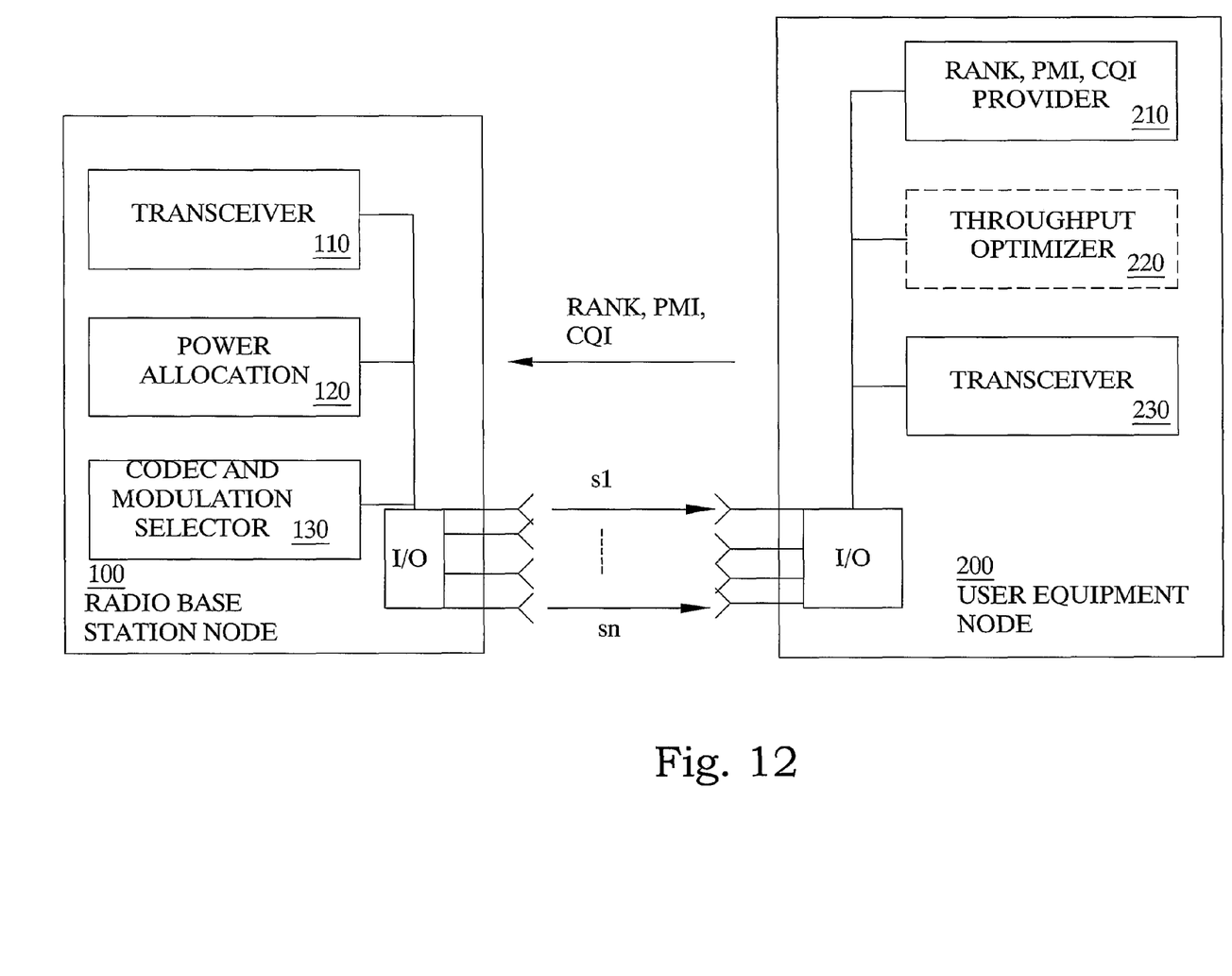
FIG. 12 illustrates improved power allocation to two data streams according to a further embodiment of the present disclosure.

With reference to FIG. 12, embodiments of a radio base station node 100 and a user equipment node 200 according to the present disclosure will be described. The nodes are configured to support the previously functionalities for enabling power allocation in a wireless communication system. As indicated in FIG. 12, a plurality of data streams s1-sn are transmitted from the radio base station node 100 to the user equipment 200, and in the opposite direction are transmitted rank, PMI and CQI. Each stream is transmitted from each radio base station antenna, and each stream is received by all UE antennas. For the uplink scenario the situation would be the opposite, e.g. data streams would be transmitted from the UE node 200 to the radio base station 100.

The radio base station node 100 is capable of exchanging a plurality of data streams with a user equipment node 200 in the wireless communication system. Further, the radio base station node 100 includes all known functionality, indicated by the generic I/O unit, for enabling modulation and coding, transmission etc. In addition, the radio base station node 100 includes a transceiver 110 configured for receiving a rank e.g. number of data streams and corresponding PMI for the rank, and a respective CQI for each of said plurality of data streams from the user equipment node. Further, the radio base station node 100 includes a power allocator or allocation unit 120 configured for allocating power to each of said plurality of data streams based on at least said received CQI. Finally, the node 100 includes a coding and modulation selector 130 configured for determining coding and modulation for each of said plurality of data streams based on at least said allocated power.

Another feature of the radio base station node is that if one stream has a really high SINR and therefore has reached its maximum MCS (modulation-coding-scheme), then the allocated power of this stream could be reduced as long as it still uses the maximum MCS. This save in power could instead be allocated to another stream, which could lead to that the second stream could use a higher MCS. Then the overall throughput of the two streams will increase without any extra power being spent.

The user equipment node 200 is capable of exchanging a plurality of data streams with the radio base station node 100 in the wireless communication system, and includes all known functionality, as indicated by the generic I/O unit, for transmitting and receiving and modulation and coding of data streams. In addition the user equipment 200 includes a rank, PMI and CQI provider 210 configured for determining a rank, corresponding PMI for the determined rank, and CQI for each of said plurality of data streams. Finally, the UE 200 includes a transceiver 230 configured for providing said determined rank, PMI and CQI to said radio base station node, to enable allocation of power to said plurality of data streams.

According to a particular embodiment the transceiver 230 is configured to prevent or suppress inter data stream interference. Typically, the transceiver would comprise a so called QR-receiver.

According to a further particular embodiment, the user equipment 200 shares a common power allocation scheme with said radio base station node 100. Consequently, said user equipment further comprises a throughput optimizer 220 configured for additionally determining an optimized rank, PMI for said optimized rank and CQI for each of said plurality of data streams based on said known common power allocation scheme, which provides a higher throughput for that data stream. In addition, the transceiver 230 is further configured to report the selected optimal rank and optimal PMI together with the corresponding CQI for each data stream prior to the power allocation scheme.

The steps, functions, procedures, and/or blocks described above may be implemented in hardware using any conventional technology, such as discrete circuit or integrated circuit technology, including both general-purpose electronic circuitry and application-specific circuitry.

Alternatively, at least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

Figure 13:
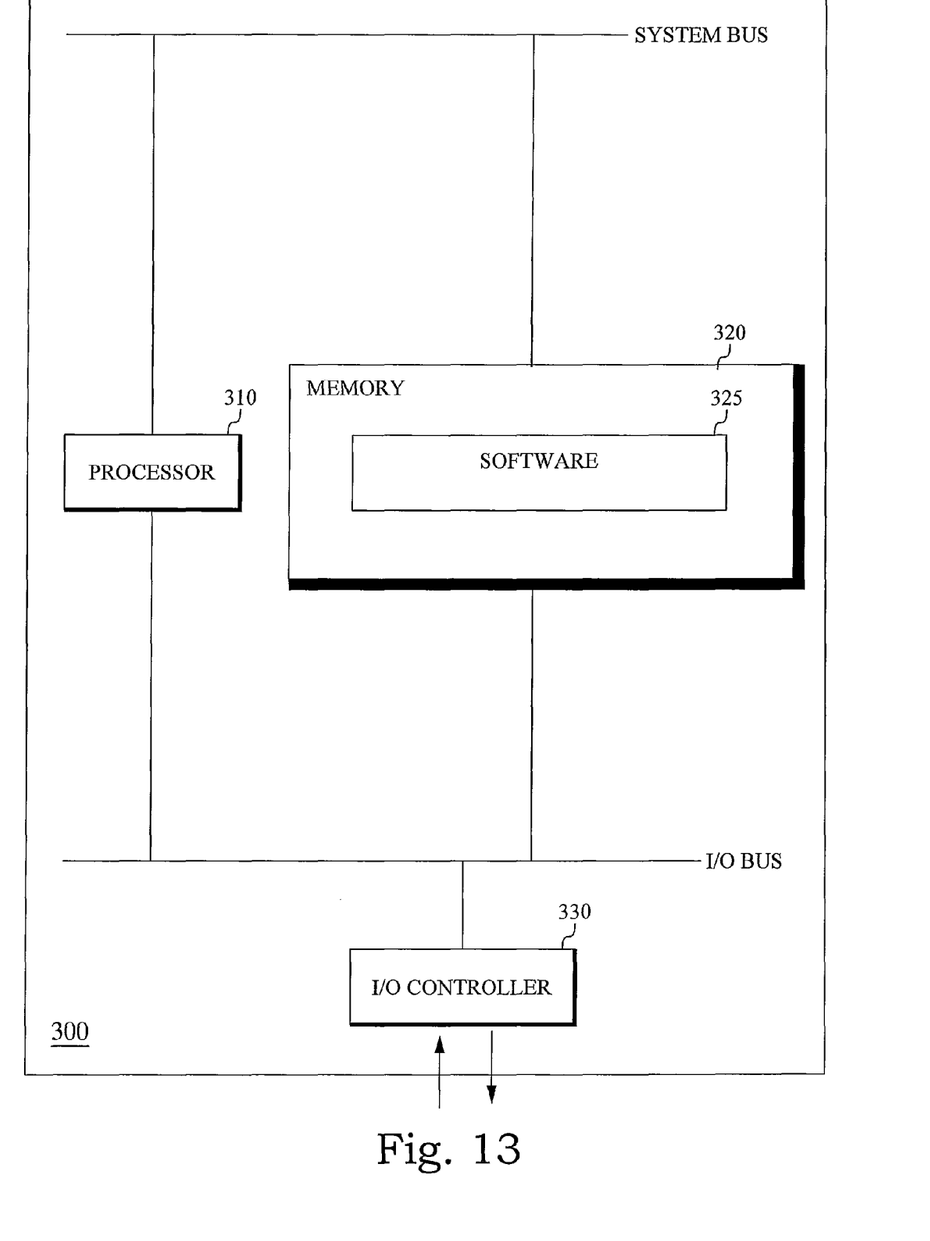
FIG. 13 illustrates a computer implementation of the embodiments of the present disclosure.

In the following, an example of a computer-implementation will be described with reference to FIG. 13. A computer 300 comprises a processor 310, an operating memory 320, and an input/output unit 330. In this particular example, at least some of the steps, functions, procedures, and/or blocks described above are implemented in software 325, which is loaded into the operating memory 320 for execution by the processor 310. The processor 310 and memory 320 are interconnected to each other via a system bus to enable normal software execution. The I/O unit 330 may be interconnected to the processor 310 and/or the memory 320 via an I/O bus to enable input and/or output of relevant data such as input parameter(s) and/or resulting output parameter(s).

One advantage of the invention is that the throughput will increase without any extra signaling or extra power being needed.

For overhead reasons it is good to avoid having to signal the power allocation on each stream to the UE and it is also good for complexity reasons to avoid the need for the UE to estimate the power allocation for each stream. Both of these issues are avoided in this disclosure.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] D. Shiu and J. M. Kahn. Layered Space-Time Codes for Wireless Communications using Multiple Transmit Antennas. In IEEE Proceedings of International Conference on Communications (ICC'99), Vancouver, B.C., Jun. 6-10, 1999.

[2] D. Wubben et al, Efficient Algorithm for Decoding Layered Space-Time Codes, Electronics Letters, v. 37, N. 22, pp. 1348-1350, October 2001.

[3] Fundamentals of Wireless Communication, David Tse and Pramod Viswanath, Cambridge University Press, 2005

The invention claimed is:

1. A method of enabling power allocation for a plurality of data streams in a user equipment node in a communication system, said user equipment node exchanging said plurality of data streams with a radio base station node in said communication system, wherein said radio base station node and said user equipment node share a common power allocation scheme known to both said user equipment node and said radio base station node, the method comprising:
   receiving, by an input/output unit of said user equipment node, a cell specific reference signal for each of said plurality of data streams;
   determining, by a rank, precoding matrix indication (PMI), and channel quality indicator (CQI) provider of said user equipment node, a rank, said rank comprising a subset of said plurality of data streams, a PMI for said rank, and a CQI for each of said plurality of data streams based on the received cell specific reference signal for each of said plurality of data streams;
   reporting, by a transceiver of said user equipment node, said determined rank, PMI and CQI for each of said plurality of data streams to said radio base station node, to enable allocation of power to said plurality of data streams;
   after reporting said determined rank, PMI and CQI for each of said plurality of data streams to said radio base station node, determining, by a throughput optimizer of said user equipment node, an optimal rank and a PMI for said optimal rank, and a CQI for each of said plurality of data streams based on said common power allocation scheme known to both said user equipment node and said radio base station node, to increase a throughput for said plurality of data streams; and
   reporting, by said transceiver of said user equipment node, said optimal rank and PMI determined based on said common power allocation scheme to said radio base station node together with the corresponding CQI prior to said common power allocation scheme.

2. The method according to claim 1, wherein the CQI reported to said radio base station node enables allocation of same power to each frequency sub band of said plurality of data streams.

3. The method according to claim 1, wherein the CQI reported to said radio base station node enables allocation of different power to each frequency sub band of said plurality of data streams.

4. A user equipment node in a communication system, said user equipment node being capable of exchanging a plurality of data streams with a radio base station node in said communication system, wherein said user equipment node and said radio base station node share a common power allocation scheme known to both said user equipment node and said radio base station node, said user equipment node comprising:
   an input/output unit that receives a cell specific reference signal for each of said plurality of data streams;
   a rank, precoding matrix indication (PMI), and channel quality indicator (CQI) provider that determines a rank comprising a subset of said plurality of data streams, a PMI for said rank, and a CQI for each of said plurality of data streams based on the received cell specific reference signal for each of said plurality of data streams;
   a transceiver that provides said determined rank, PMI and CQI for each of said plurality of data streams to said radio base station node, to enable allocation of power to said plurality of data streams; and
   a throughput optimizer that determines, after providing said determined rank, PMI, and CQI for each of said plurality of data streams to said radio base station node by the transceiver, an optimized rank, a PMI for said optimized rank, and a CQI for each of said plurality of data streams based on said common power allocation scheme known to both said user equipment node and said radio base station node, to increase a throughput for said plurality of data streams, and wherein said transceiver further reports said optimized rank and PMI determined based on said common power allocation scheme to said radio base station node together with the corresponding CQI prior to said common power allocation scheme.

5. The user equipment node according to claim 4, wherein said transceiver further suppresses inter data stream interference.

* * * * *